Figure 1:
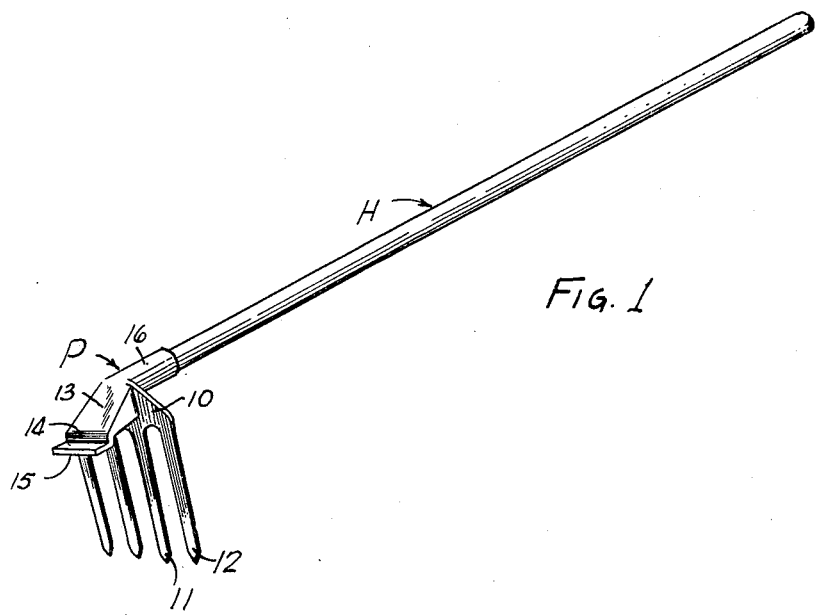

Feb. 21, 1950   H. CLAYDEN   2,498,069
GARDEN TOOL
Filed May 9, 1944

INVENTOR.
HAROLD CLAYDEN
BY
Joshua R. H. Potts
HIS ATTORNEY

Patented Feb. 21, 1950

2,498,069

UNITED STATES PATENT OFFICE 2,498,069

GARDEN TOOL

Harold Clayden, Philadelphia, Pa.

Application May 9, 1944, Serial No. 534,724

2 Claims. (Cl. 254—131.5)

This invention relates to garden tools and is concerned primarily with those tools employed by the growers of small gardens to initially turn over or cultivate the soil by hand.

At the present time, the nation is "victory garden" conscious. This has been caused by the world war and the ensuing shortage of foods. Those high in our government have called upon all citizens to whenever possible raise "victory gardens." As a result, many people who are not physically adapted to strenuous manual activity are called upon to perform such operations as spading a plot of ground for gardening.

It is now universally recognized that in order for a garden to be productive, the ground must be initially cultivated to an appreciable depth. The usual procedure has been to employ a spade or garden fork to "turn the ground over." The operations involving the use of either of these conventional implements essentially requires the lifting of a clod of dirt and this lifting usually is accompanied by the strain required to break the clod of dirt loose. As a result, many people not used to physical work of this type start their gardens only with great hardship and physical discomfort. Moreover, it is almost impossible for housewives and members of the feminine sex to start a garden without calling upon others to perform this initial cultivation.

With these conditions in mind, this invention has in view as its foremost objective, the provision of a garden tool which may be employed to carry out manually the initial cultivation of soil with a maximum of ease and a minimum of discomfort to the operator. In achieving this objective, the invention provides a tool which is essentially characterized as including a prong assembly from which extends a handle in right angular relation to the prongs.

More in detail, the invention provides a garden tool consisting of a handle which carries at one end a prong assembly that is comparable to the well known garden fork with the prongs normal to the handle.

A further detailed, yet important object of the invention, is the provision of a garden tool of the character aforesaid which includes a fulcrum element that is carried by the prong assembly at the side opposite to that from which the handle extends. This fulcrum element is intended to bear against the surface of the ground after the prongs have been inserted and becomes effective when the operator lifts the handle to cause the desired action of the prongs on the soil.

This fulcrum element takes the form of a plate that extends rearwardly from the back of the fork assembly and which is formed with a surface adapted for engagement with the ground.

Various other more detailed objects and advantages of the invention, such as arise in connection with carrying out the above noted thoughts in a practical embodiment, will in part become apparent and in part be hereinafter stated as a description of the invention proceeds.

The invention, therefore, comprises a garden tool, consisting of a prong assembly carrying a fulcrum element and from which extends a handle in right angular relation to the prongs.

Figure 2:
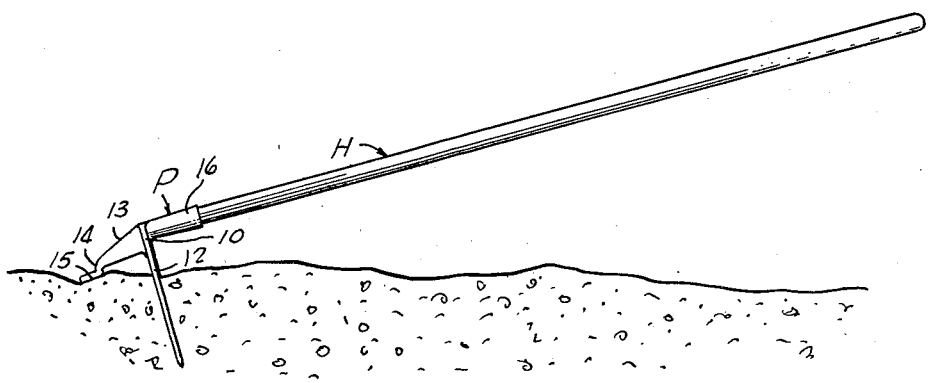

For a full and more complete understanding of the invention, reference may be had to the following description and accompanying drawing, wherein:

Figure 1 is a perspective of a garden tool, made in accordance with the precepts of this invention; and Figure 2 is a side view, showing the garden tool as it is used.

Referring now to the drawing wherein like reference characters denote corresponding parts and first more particularly to Figure 1. The novel garden tool of this invention is shown as comprising a prong assembly which is referred to in its entirety by the reference character P and a handle shown at H. The prong assembly P consists of a back or supporting rib 10 from which depend a plurality of prongs 11. In the form of invention illustrated in the drawing the back 10 is shown as carrying four of the prongs 11. This particular number is intended as no limitation on the invention as obviously the number of prongs could be varied without departing from the spirit of the invention.

Each of the prongs 11 is formed at its free end with a point 12 to facilitate penetration of the soil by the prongs.

Extending from one face of the back 10 is a plate 13 that is formed with a downwardly extending flange 14, the free edge of which is enlarged to provide a ground engaging face 15.

It is evident that the prong assembly P can be connected to the handle H by any of several well known connections. In the illustrated embodiment the back 10 is shown as carrying a socket 16 which is formed integrally therewith and which projects from the back 10 in a direction normal to the prongs 11. It is notable that the plate 13 and socket 16 are substantially in alignment. One end of the handle H is received in socket 16 to establish the connection.

It is intended that the handle H be comparatively long in length, in fact longer than the usual rake handle. The invention has particularly in mind the use of a handle which will be in the neighborhood of six feet in length. The operator grasps the handle in a convenient manner by both hands, and swings the tool so as to cause the prongs 11 to penetrate the soil substantially to the full length of the prongs. If the soil should be loose and in a favorable condition, all that will be necessary then is to exert a pull on the handle. This will loosen up the clod of dirt immediately in front of the prongs and the prongs will break up this clod. However, should there be great cohesion between the particular clod and the uncultivated body of ground, such as might be caused by the roots of weeds and similar conditions, an upward lifting force will be exerted on the handle, such as indicated by the arrow in Figure 2. Due to the long length of the handle and the presence of the fulcrum element, great leverage is rendered effective on the prongs and this will break loose even a clod of the toughest ground.

In cultivating a garden plot, the procedure usually followed in spading or turning over the ground will be adopted; that is the operator begins at one edge and works along a line of the uncultivated ground. Each time the prongs of the tool are inserted at a predetermined distance from the edge to break loose a clod of the desired size. When the plot is finished it will be in substantially the same condition as if the ground had been gone over by a spade or garden fork.

While a preferred specific embodiment of the invention is hereinbefore set forth, it is to be clearly understood that the invention is not to be limited to the exact constructions illustrated and described, because various modifications of these details may be provided in putting the invention into practice, within the purview of the appended claims.

What is claimed is:

1. A garden tool of the character described, comprising a prong assembly including a back from which depend a plurality of prongs, a plate extending from one face of said back in a direction perpendicular to the plane thereof and formed with a surface adapted to engage the ground, a socket member extending from the opposite face of said back and in a direction perpendicular to the plane of said prongs, and substantially in the same plane as the said plate, and a handle element having one end fitted in said socket.

2. A garden tool of the character described comprising a prong assembly consisting of a back from which depend a plurality of prongs, the points of said prongs being remote from said back, a socket member extending from one face of said back in a direction substantially normal to said prongs, a fulcrum element extending from the opposite face of said back and having a ground engaging surface spaced from said prongs and in a plane that is closer to said points than said socket, the edge of said ground engaging surface that is remote from said prongs being at a distance from said prongs which is less than the length of said prongs, and a handle element having one end fitted in said socket.

HAROLD CLAYDEN.

REFERENCES CITED

The following references are of record in the file of this patent:

UNITED STATES PATENTS

| Number | Name | Date |
|---|---|---|
| 137,124 | Blanchard | Mar. 25, 1873 |
| 1,023,720 | Caudell | Apr. 16, 1912 |
| 1,107,705 | Ruddy | Aug. 18, 1914 |
| 1,142,783 | Eagan | June 8, 1915 |
| 1,902,705 | Kee | Mar. 21, 1933 |

FOREIGN PATENTS

| Number | Country | Date |
|---|---|---|
| 379,524 | France | Sept. 11, 1907 |
| 458,704 | France | Oct. 17, 1913 |